Aug. 8, 1939.　　　　F. R. ELLIOTT　　　　2,168,821
TRACTION SPRAYER
Filed July 17, 1936
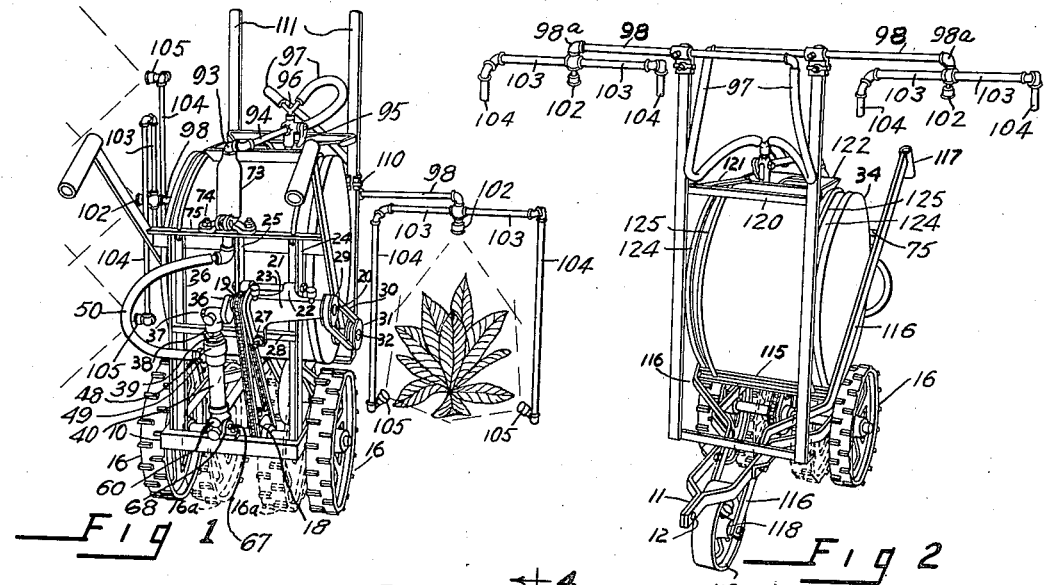
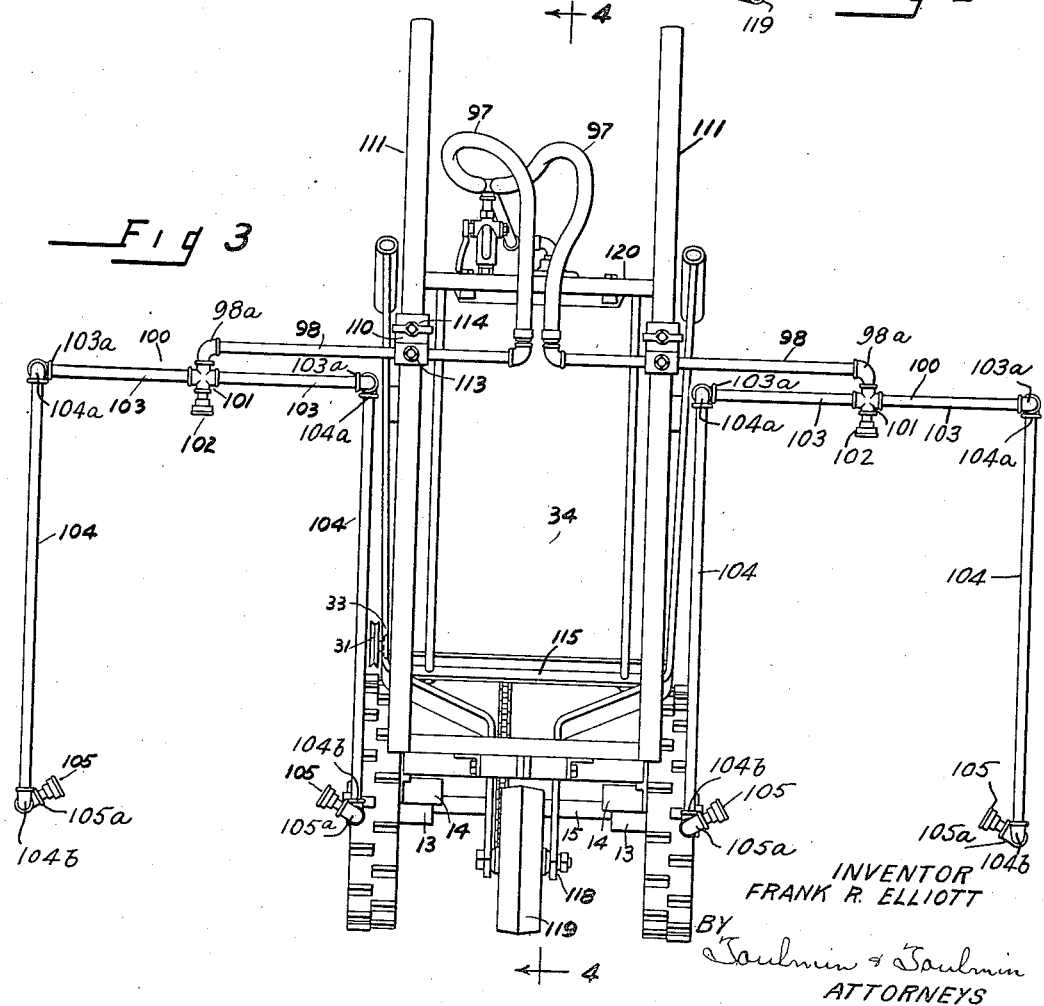
INVENTOR
FRANK R. ELLIOTT
BY
Toulmin & Toulmin
ATTORNEYS Patented Aug. 8, 1939

2,168,821

UNITED STATES PATENT OFFICE 2,168,821

TRACTION SPRAYER

Frank R. Elliott, Ashland, Ohio, assignor to The F. E. Myers and Bro. Company, Ashland, Ohio, a corporation of Ohio Application July 17, 1936, Serial No. 91,166

2 Claims. (Cl. 299—46)

This invention relates to spraying devices, and in particular, to traction sprayers which operate automatically as the sprayer is moved.

Another object is to provide a traction sprayer having a frame thereon for adjustably supporting the spray nozzles, and arranged to permit adjustment of the spray nozzles both vertically and horizontally so as to adapt their positions to the plants or other articles being sprayed.

Another object is to provide a traction sprayer having a multiple nozzle arrangement associated therewith, whereby one nozzle directs a spray downwardly in a vertical direction upon the article being sprayed, and another pair of nozzles directs a spray upwardly in an oblique direction so that the article is sprayed both from above and from beneath, on both sides thereof.

Another object is to provide a multiple nozzle arrangement of the type just described, wherein the sprayer is equipped with a frame having means for adjusting the multiple nozzle arrangement vertically and also preferably horizontally, in order to adapt it to the distance between the rows of plants or other articles being sprayed.

Another object is to provide a traction sprayer having a multiple spray nozzle arrangement adapted in one position to dispose the nozzles in position for spraying plants or other articles, and in another position to be folded so as to occupy a very small amount of space.

In the drawing:

Figure 1 is a rear elevation in perspective of the traction spraying device of this invention, showing one of the multiple spray nozzle arrangements in position for spraying a plant, and the other multiple spray nozzle assembly in its folded position.

Figure 2 is a front elevation in perspective of the traction sprayer shown in Figure 1, but with a single nozzle mounted on each side of the machine, at the front thereof, in place of the multiple nozzle assembly shown in Figure 1.

Figure 3 is an enlarged front elevation of the traction sprayer shown in Figure 1, showing a pair of multiple nozzle assemblies in position for spraying a double row of plants or other articles.

In general, the traction sprayer of this device consists of a tank mounted upon wheels which are drivingly connected to operate a pump as the sprayer is advanced, as by a horse or a tractor. The pump thus operated withdraws fluid from the tank and pumps it, by way of a cushion chamber and a combination valve, to a spray nozzle.

Referring to the drawing in detail, Figures 1, 2 and 4 show the traction sprayer of this invention as consisting of a base frame 10 having a forwardly extended portion 11 for attachment to a horse or tractor, as by a connection made through the hole 12 therein. Mounted upon this base frame 10 are journals 13 (Figure 3), having overhanging portions 14 adapted to protect the journals 13. Mounted for rotation in the journals 13 is an axle 15 having wheels 16 on the opposite ends thereof. The wheels 16 are removably mounted upon the ends of the axle 15 in such a manner that they may be taken off and replaced inside the base frame 10 between the opposing journals 13. In Figure 1 the outer position of the wheels is shown in solid lines, designated 16, and the inner position in dotted lines, designated 16a. By this arrangement the tread of the machine is narrowed to such an extent that the sprayer may be employed in very narrow spaces between rows of plants or other articles arranged closer together.

Mounted on the axle 15 is a sprocket 17 (Figure 1) engaging a sprocket chain 18, the opposite end of which passes around a driven sprocket 19. The driven sprocket 19 (Figure 1) is mounted upon a countershaft 20 supported in a pivoted shaft hanger 21, having pivot bosses 22 arranged to move pivotally upon the pivot rod 23. The latter is secured between the frame uprights 24 and 25 rising from the base frame 10. An additional frame upright 26 rises from the opposite side of the base frame 10 from the upright 24. The free end of the shaft hanger 21 is provided with an adjusting screw 27, which passes through the shaft hanger 21 and engages the frame cross member 28 (Figure 1). Consequently, when the adjusting screw 27 is turned the free end of the shaft hanger 21 is moved in one direction or the other, thereby tightening or loosening the sprocket chain 18 by varying the distance between the axle 15 and the countershaft 20.

Mounted upon the opposite end of the countershaft 20 from the sprocket 19 is a pulley 29 having a belt 30 arranged to drive a pulley 31 upon the agitator shaft 32. The latter is journalled, as at 33, (Figure 3) in the side wall of the tank 34 and carries on its inner end an agitator adapted to agitate the contents of the tank 34 as the traction sprayer advances. The agitator may consist of paddle blades adapted to perform this agitating function. Mounted on the end of the countershaft 20, adjacent the sprocket 19, is a crank 36 (Figure 1), having a crank pin 37 extending outwardly therefrom and engaged by the crosshead 38 of the pump plunger 39 of the pump, generally designated 40. The fluid pumped by the pump 40 passes into the connection 48 having the terminal 49 of the fluid pipe 50 secured thereto.

To the lower end of the pump barrel 43 is secured a head 60 to which the supply pipe 64 is attached. The head 60 is pivotally mounted at its lower end upon a pivot pin 67 supported by the bifurcated bracket 68 having its base portion secured to the base frame 10. The opposite end of the supply pipe 64 is attached to the tank 34, whereas the opposite end of the pipe 50 is attached to the air chamber 73. The latter is mounted, as by the bolts 74 (Figure 1), upon the upper frame cross member 75 secured to and extending between the vertical frame members 24, 25 and 26.

With the pump 40 in operation the fluid passes from the tank 34, through the pipe 64 and the pump 40 (Figure 1), into the pipe 50, and thence into the air chamber 73 as the wheels 16 rotate the axle 15 and cause the crank pin 37 to reciprocate by the intermediate action of the sprocket chain 18 upon the sprocket 19. The fluid pumped into the air chamber 73 leaves it through the connection 93 and passes through the pipe 94 to the control valve, generally designated 95. Beyond the control valve 95, the fluid passes into the Y-connection 96 and the pipes 97 (Figures 1 and 3) to the discharge pipes 98. The outer ends of the discharge pipes 98 may be connected either directly to the nozzle tips 99 (Figure 2) or to the multiple nozzle arrangement, generally designated 100, consisting of the four-way connection 101 having a nozzle tip 102 attached to one branch thereof and the pipes 103 attached to two of the remaining ports of the four-way connection 101. The remaining port of the connection 101 is attached to the end of the discharge pipe 98, and the outer ends of the pipes 104 terminate in the obliquely directed nozzle tips 105.

The discharge pipes 98 are supported in clamps 110 mounted upon the vertical frame uprights 111. By loosening the set screws 113 the discharge pipes 98 may be moved horizontally, and by loosening the set screws 114 the entire spray nozzle assembly may be moved vertically along the uprights 111 (Figure 3). The tank 34 is supported upon a cross member 115 extending between the obliquely directed frame members 116. The latter terminate at their upper ends in the handles 117, and intermediately are interconnected by the frame cross member 75. The lower ends of the frame members 116 are interconnected by the axle 118, upon which is mounted the wheel 119. The frame uprights 111 are additionally interconnected by the horizontal frame member 120, from which the members 121 (Figures 1 and 2) extend rearwardly to the member 122 surrounding the filling aperture of the tank 34.

The tank 34 rests in a cradle formed by the straps 124 attached at their lower ends to the frame cross member 115 and at their upper ends to the frame cross member 75. The rods 125, secured at their opposite ends to these same members and passing over the top of the tank, hold the tank securely against the straps 124.

The operation of the traction spraying device as a whole is self-evident from the operation which has been described in connection with its various parts. A horse or a tractor is attached to the front portion 11 of the base frame, and the traction sprayer is caused to advance between the rows of plants or other articles to be sprayed. The nozzles are properly adjusted, according to the particular arrangement of plants to be sprayed. The rotation of the wheels 16 then operates the pump 40 through the intermediate action of the sprockets 17 and 19, the sprocket chain 18 and the crank pin 37 on the crank 36. The pump pumps the fluid from the tank 34, through the pipes 64 and 50, to the air chamber 73, where the pulsations of the pump are eliminated. The fluid passes onward through the pipe 94, into the valve 95, and thence through the connection 96 and flexible pipe 97, and discharge pipe 98 to the various nozzles. Meanwhile, the agitator shaft 32 is rotated by the same action, and maintains the contents of the tank 34 in a thoroughly mixed condition, thus preventing settling of any solid ingredients which may be employed in the fluid.

In the event that the plants or other objects to be sprayed are placed in rows so close together that the normal position of the wheels 16 will not permit the sprayer to pass between the rows, the wheels 16 may be removed from their position on the outside of the base frame 10 and placed on the inside, in the manner shown in dotted lines 16a in Figure 1. This is done by removing the axle 15 from its journals 13 and sprocket 17, placing the wheels 16 within the base frame 10 and then replacing the axle 15 and tightening the various wheels and sprocket 17 thereon.

When high plants are to be sprayed the horizontal pipes 103 of the triple nozzle unit 100 can be folded into a vertical position and the vertical nozzle pipes 104 folded alongside it into the position shown at the left-hand side of Figure 1. In this arrangement the nozzles are set to spray outwardly at vertically spaced locations so that a plant of considerable height can be thoroughly sprayed. In this manner the sides of high plants facing each other in adjacent rows can be sprayed at a single passage of the machine. The spray zones in this arrangement are indicated by the dashed lines in Figure 1. This foldable arrangement of the nozzle pipes also enables the machine to be made more compact while in transit and not spraying. This vertical arrangement of the nozzle unit 100 is provided by means of a pivotal connection between the pipes 103 and 104 consisting of the double elbows 103a and 104a, interconnected by nipples (not visible). The nozzles 105 are similarly connected to the pipes 104 by the double elbows 104b and 105a. In order to place the pipes 103 in the vertical positions shown in Figure 1, the elbows 98a are preferably removed and the pipes 98 threaded directly into the four-way connections 101. Then the pipes 98 may be moved inward, past one another, by loosening the set screws 113, as in Figure 2. This brings the now vertical pipes 103 to a position closely adjacent the uprights 111.

It will be understood that I desire to comprehend within my invention such modifications as come within the scope of the claims and the invention.

Having thus fully described my invention, what I claim as new and desire to secure by Letters Patent, is:

1. In combination in a traction sprayer, a frame, wheels on said frame, a tank, a pump, mechanism adapted to operate said pump, an upright attached to said frame, a discharge pipe adjustably mounted on said upright, a nozzle pipe with a spray nozzle connected to said discharge pipe and positioned to spray downwardly, a pair of spaced nozzle pipes mounted on the first nozzle pipe and having spray nozzles spaced apart from said first spray nozzle and positioned to spray upwardly, means for folding said nozzle pipes relatively to each other to selectively direct said nozzles toward differently disposed locations, and means for supplying fluid simultaneously to said nozzles.

2. In combination in a traction sprayer, a frame, wheels on said frame, a tank, a pump, mechanism adapted to operate said pump, an upright attached to said frame, a discharge pipe adjustably mounted on said upright, a nozzle pipe with a spray nozzle connected to said discharge pipe and positioned to spray downwardly, a pair of spaced nozzle pipes mounted on the first nozzle pipe and having spray nozzles spaced apart from said first spray nozzle and positioned to spray upwardly in opposite oblique directions, means for folding said pair of spray nozzle pipes relatively to the spray nozzle pipe on which they are mounted to direct said nozzles toward differently disposed locations, and means for supplying fluid simultaneously to said nozzles.

FRANK R. ELLIOTT.